United States Patent
Chen et al.

(10) Patent No.: US 12,072,060 B2
(45) Date of Patent: Aug. 27, 2024

(54) FIXING MODULE AND DISPLAY DEVICE USING THE SAME

(71) Applicant: Qisda Corporation, Taoyuan (TW)

(72) Inventors: Jen-Feng Chen, Taichung (TW);
Shih-An Lin, New Taipei (TW);
Kuan-Hsu Lin, New Taipei (TW);
Hsin-Hung Lin, Taoyuan (TW);
Yung-Chun Su, Taoyuan (TW);
Nien-Tsung Hsu, Taoyuan (TW);
Hsin-Che Hsieh, Taoyuan (TW);
Hao-Chun Tung, Taoyuan (TW);
Yang-Zong Fan, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 198 days.

(21) Appl. No.: 17/700,642

(22) Filed: Mar. 22, 2022

(65) Prior Publication Data
US 2023/0235849 A1  Jul. 27, 2023

(30) Foreign Application Priority Data

Jan. 24, 2022  (CN) .......................... 202210078653.6

(51) Int. Cl.
*F16M 13/02* (2006.01)
*F16M 11/22* (2006.01)

(52) U.S. Cl.
CPC .......... *F16M 13/022* (2013.01); *F16M 11/22* (2013.01); *F16M 2200/027* (2013.01)

(58) Field of Classification Search
CPC . F16M 13/022; F16M 11/22; F16M 2200/027
See application file for complete search history.

(56) References Cited

U.S. PATENT DOCUMENTS

| | | | | |
|---|---|---|---|---|
| 4,844,387 A | * | 7/1989 | Sorgi | F16M 13/00 108/5 |
| 6,370,741 B1 | * | 4/2002 | Lu | A47B 21/045 24/523 |
| 6,398,175 B1 | * | 6/2002 | Conner | B25B 1/2405 248/228.3 |
| 6,769,657 B1 | * | 8/2004 | Huang | F16M 13/022 248/278.1 |
| 7,093,811 B2 | * | 8/2006 | Wu | G03B 17/02 248/912 |
| 7,121,516 B1 | * | 10/2006 | Koh | F16M 13/022 248/227.2 |

(Continued)

FOREIGN PATENT DOCUMENTS

| | | |
|---|---|---|
| CN | 206175989 U | 5/2017 |
| CN | 105937688 B | 5/2018 |

(Continued)

OTHER PUBLICATIONS

Office action of counterpart application by Taiwan IP Office on Apr. 12, 2022.

*Primary Examiner* — Monica E Millner (57) ABSTRACT

A fixing module suitable for fixing to one of a first end and a second end of a screen bracket is provided. The fixing module includes a first part and a second part. The second part is slidably connected to the first part. The fixing module is configured to be fixed to the first end of the screen bracket by the first part or fixed to the second end of the screen bracket by the second part.

19 Claims, 10 Drawing Sheets

(56) References Cited

U.S. PATENT DOCUMENTS

| | | | |
|---|---|---|---|
| 7,546,993 B1* | 6/2009 | Walker | F16M 11/24 |
| | | | 248/229.12 |
| 7,684,881 B2 | 3/2010 | Lloyd | |
| 9,115,740 B2* | 8/2015 | Chang | F16M 11/043 |
| 10,253,926 B1* | 4/2019 | Fan | F21V 21/096 |
| 11,075,664 B2* | 7/2021 | Lin | H04M 1/04 |
| 11,480,288 B2* | 10/2022 | Huang | F16M 11/10 |
| 11,603,960 B1 | 3/2023 | Wen et al. | |
| 11,802,657 B2* | 10/2023 | Hsieh | F16M 13/022 |
| 2008/0054133 A1* | 3/2008 | Huang | F16M 11/2064 |
| | | | 248/178.1 |
| 2008/0179899 A1* | 7/2008 | Yang | G06F 1/1607 |
| | | | 292/256 |
| 2009/0173853 A1 | 7/2009 | Fawcett et al. | |
| 2011/0315843 A1* | 12/2011 | Hung | F16M 13/022 |
| | | | 248/278.1 |
| 2012/0273630 A1 | 11/2012 | Gillespie-Brown et al. | |
| 2013/0321715 A1 | 12/2013 | Millson et al. | |
| 2015/0050077 A1* | 2/2015 | Huang | F16M 11/2064 |
| | | | 403/327 |
| 2016/0230921 A1* | 8/2016 | Fan | F16M 11/105 |
| 2017/0293206 A1 | 10/2017 | Wood | |
| 2019/0045143 A1* | 2/2019 | Williams, IV | F16M 11/28 |
| 2022/0397230 A1* | 12/2022 | Tucker | F16M 11/18 |
| 2023/0189456 A1* | 6/2023 | Chen | H05K 5/0204 |
| | | | 361/807 |

FOREIGN PATENT DOCUMENTS

| | | |
|---|---|---|
| CN | 207814783 U | 9/2018 |
| CN | 209245661 U | 8/2019 |
| WO | 2020248392 A1 | 12/2020 |

* cited by examiner

FIXING MODULE AND DISPLAY DEVICE USING THE SAME

This application claims the benefit of People's Republic of China application Serial No. 202210078653.6, filed Jan. 24, 2022, the subject matter of which is incorporated herein by reference.

BACKGROUND OF THE INVENTION

Field of the Invention

The invention relates in general to a fixing module and a display device using the same.

Description of the Related Art

Conventional display includes a screen, a bracket and a base. The bracket connects the screen and base. In order to adjust the angle of the screen, the screen and the bracket normally are pivotally connected by rotating with respect to each other. The base can only be placed on a plane (such as on a desktop). However, such structure confines the placement of the display to a plane, hence limiting the configuration and application of the display. Therefore, it has become a prominent task for the industries to provide a new display capable of resolving the above problems encountered in the prior art.

SUMMARY OF THE INVENTION

Thus, the present invention provides a fixing module and a display device using the same for resolving the generally known problems.

According to an embodiment of the present invention, a fixing module is provided. The fixing module is suitable for fixing to one of a first end and a second end of a screen bracket. The fixing module includes a first part and a second part. The second part is slidably connected to the first part. The fixing module is configured to be fixed to the first end of the screen bracket by the first part or fixed to the second end of the screen bracket by the second part.

According to another embodiment of the present invention, a display device is provided. The display device includes a screen bracket, a screen and a fixing module. The screen bracket includes a first end and a second end. The screen is pivotally connected to the screen bracket. The fixing module suitable for fixing to one of the first end and the second end of the screen bracket. The fixing module includes a first part and a second part. The second part is slidably connected to the first part. The fixing module is configured to be fixed to the first end of the screen bracket by the first part or fixed to the second end of the screen bracket by the second part.

According to an alternate embodiment of the present invention, a display device is provided. The display device includes a screen bracket, a screen and a fixing module. The screen bracket includes a first end and a second end. The screen is pivotally connected to the screen bracket. The fixing module suitable for fixing to one of the first end and the second end of the screen bracket. The fixing module includes a first part and a second part. The second part is slidably or movably connected to the first part. The fixing module is configured to be fixed to the first end of the screen bracket by the first part or fixed to the second end of the screen bracket by the second part. The first part has a first engaging member. The second part has a second engaging member selectively and correspondingly engaged with the second engaging member.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
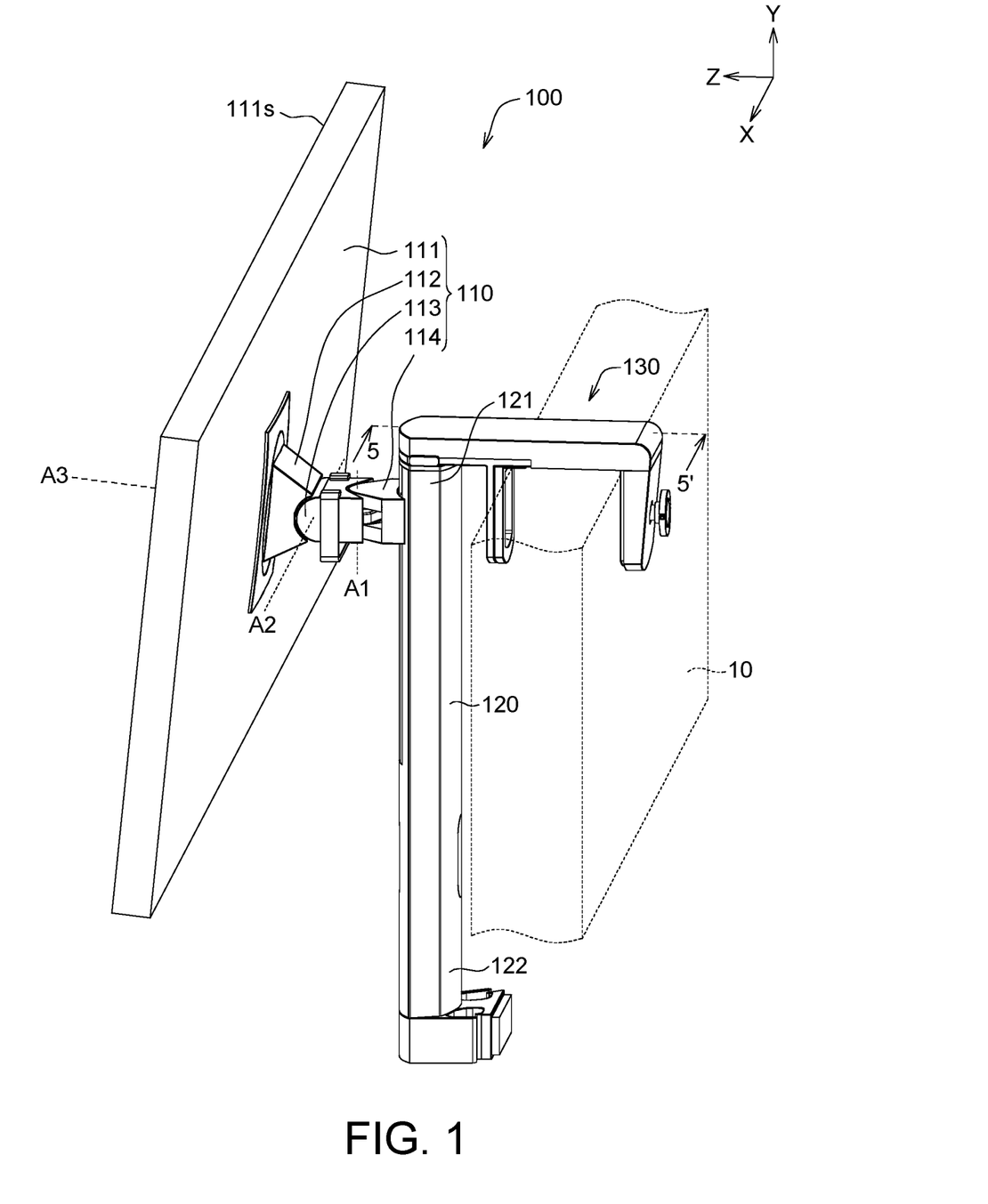
FIG. 1 is a schematic diagram of a display device according to an embodiment of the present invention.
Figure 2:
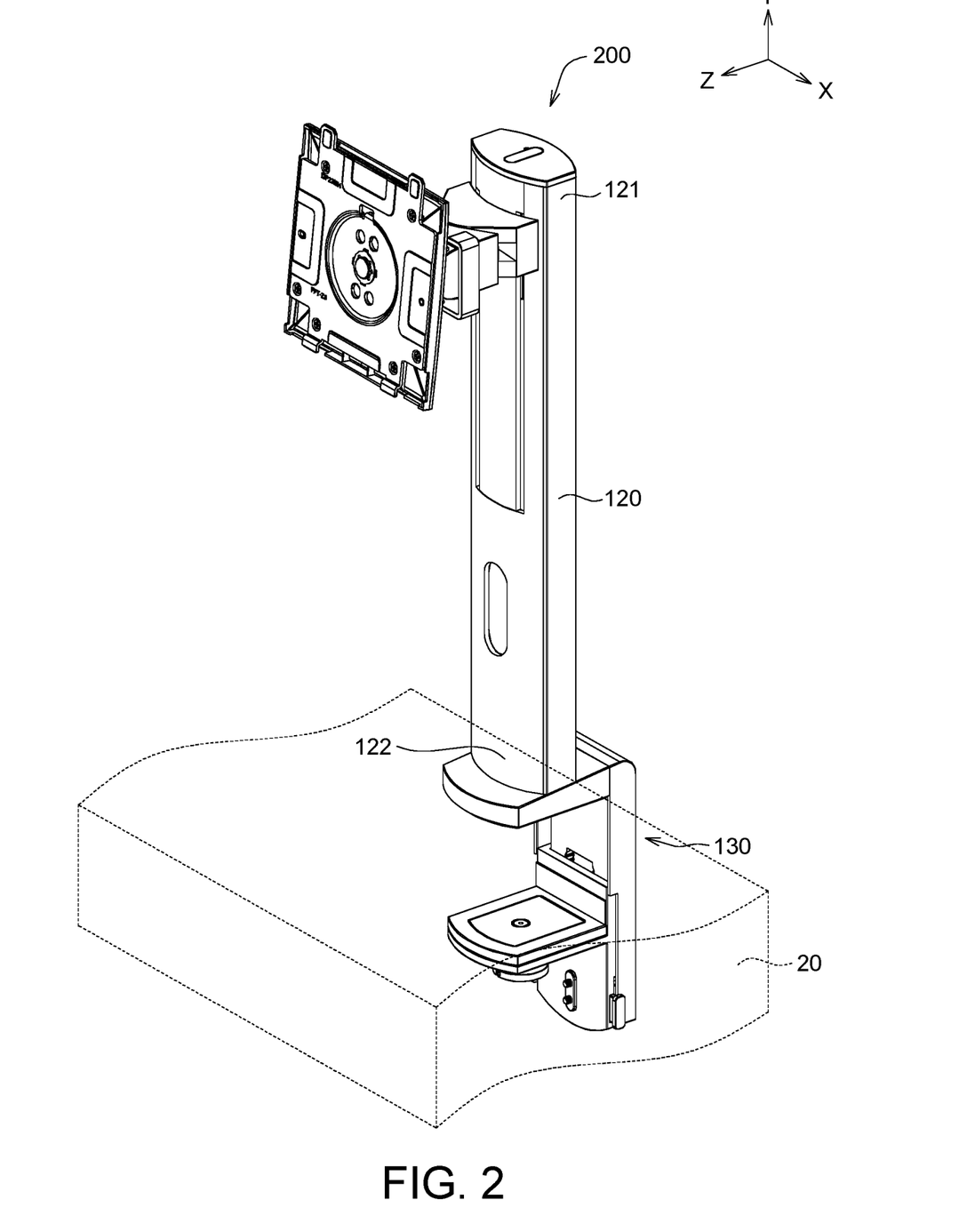
FIG. 2 is a schematic diagram of a display device (screen not illustrated) according to another embodiment of the present invention.

Refer to FIGS. 1 and 2. FIG. 1 is a schematic diagram of a display device 100 according to an embodiment of the present invention. FIG. 2 is a schematic diagram of a display device 200 (screen 110 is not illustrated) according to another embodiment of the present invention. Among the accompanying drawings of the present specification, only FIG. 1 illustrates the screen 110.

The display device 100 includes a screen 110, a screen bracket 120 and a fixing module. The screen 110 is pivotally connected to the screen bracket 120. The screen bracket 120 includes a first end 121 and a second end 122. The fixing module is selectively fixed to one of the first end 121 and the second end 122 to match the extending direction of the board clamped by the fixing module 130. As indicated in FIG. 1, when the extending direction of the board 10 clamped the fixing module 130 is substantially parallel to the screen bracket 120, the fixing module 130 can be fixed to the first end 121 of the screen 110. As indicated in FIG. 2, when the board 20 clamped by the fixing module 230 is substantially perpendicular to the extending direction of the screen bracket 120, the fixing module 230 can be fixed to the second end 122 of the screen 110. The board 10 can be realized by a vertical partition, and the board 20 can be realized by a desktop.

As indicated in FIG. 1, the screen 110 includes a screen body (such as a display panel) 111, a first pivot 112, a second pivot 113 and a third pivot 114. The screen body 111 can rotate around at least one shaft (or axial direction) with respect to the screen bracket 120. The third pivot 114 and the second pivot 113 can be rotatably swiveled with respect to the first shaft (or axis) A1; the first pivot 112 and the second pivot 113 can be rotatably tilted with respect to the second shaft A2; the screen body 111 and the first pivot 112 can be rotatably pivoted with respect to the third shaft A3, wherein two of the first shaft A1, the second shaft A2 and the third shaft A3 are perpendicular to each other; the third shaft A3 is parallel to the normal direction of the display surface 111s of the screen body 111. Besides, the third pivot 114 and the screen bracket 120 can slide with respect to each other along the extending direction of the screen bracket 120 (such as the Y direction). For example, the screen bracket 120 has at least one chute (not illustrated), and the third pivot 114 has at least one slider (not illustrated) pivotally connected to the chute, so that the third pivot 114 and the screen bracket 120 can slide with respect to each other.

Figure 3:
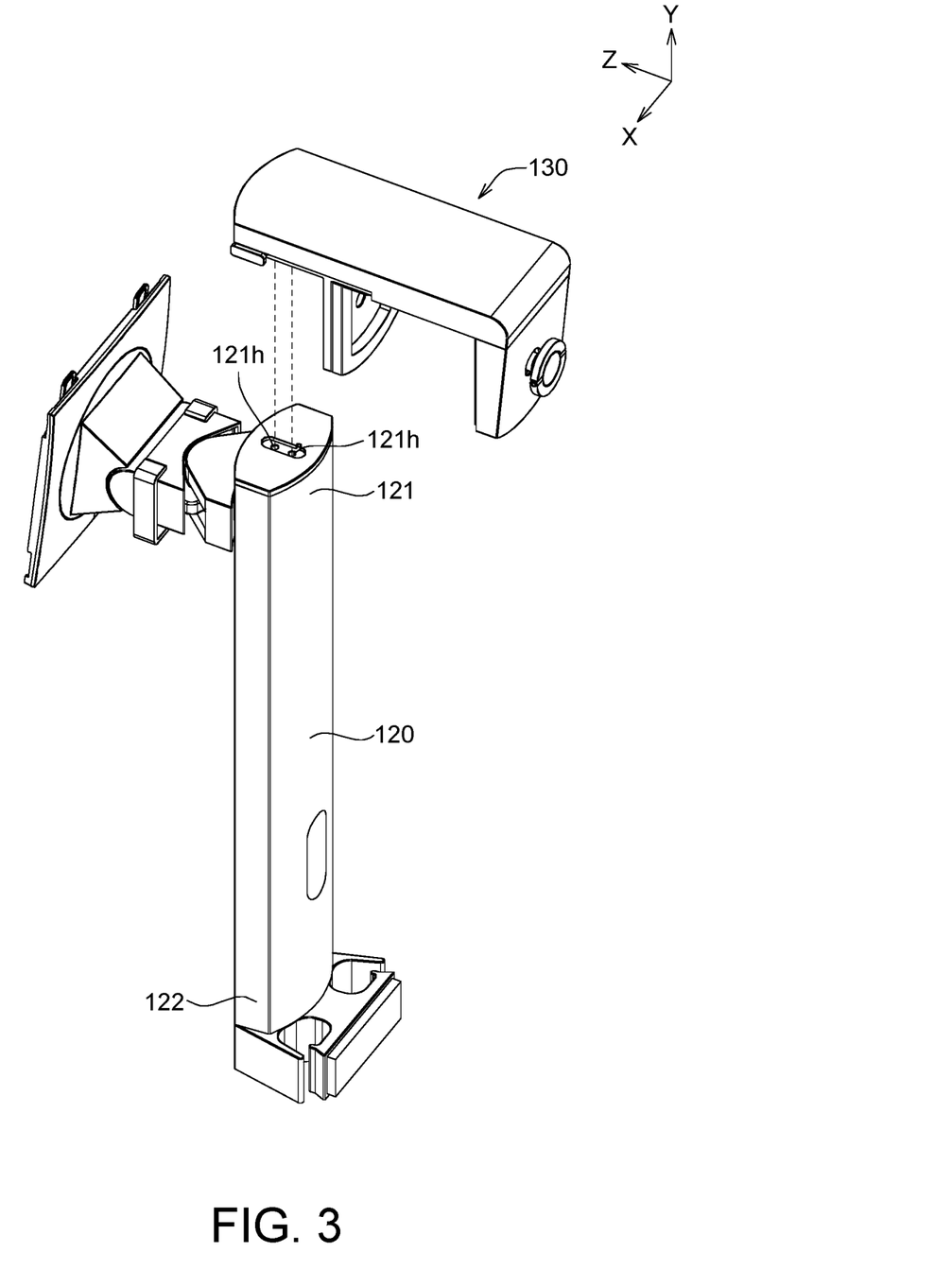
FIG. 3 is an explosion diagram of the display device of FIG. 1.
Figure 4A:
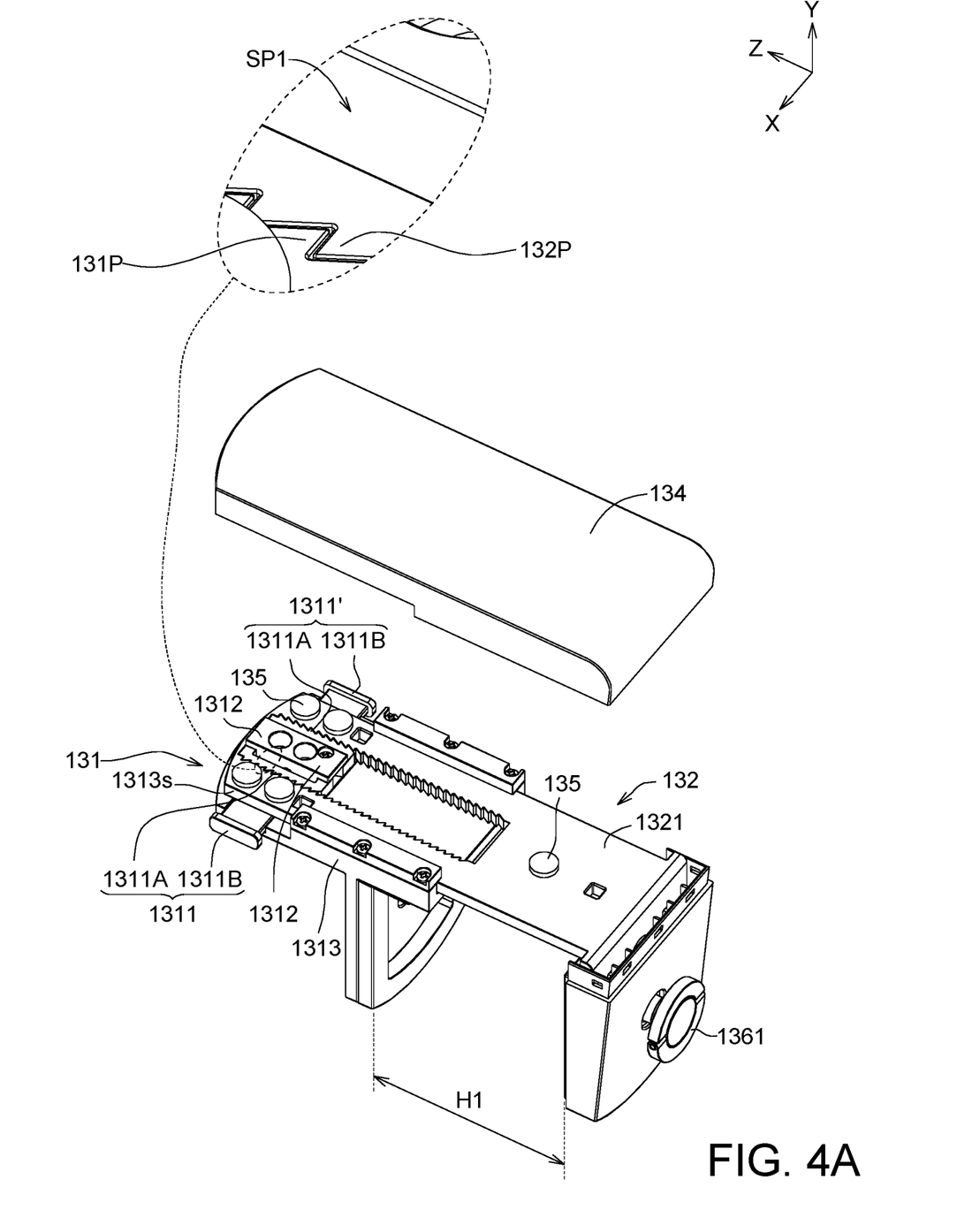
FIGS. 4A to 4C are explosion diagrams of the fixing module of FIG. 3 at different view angles.
Figure 4B:
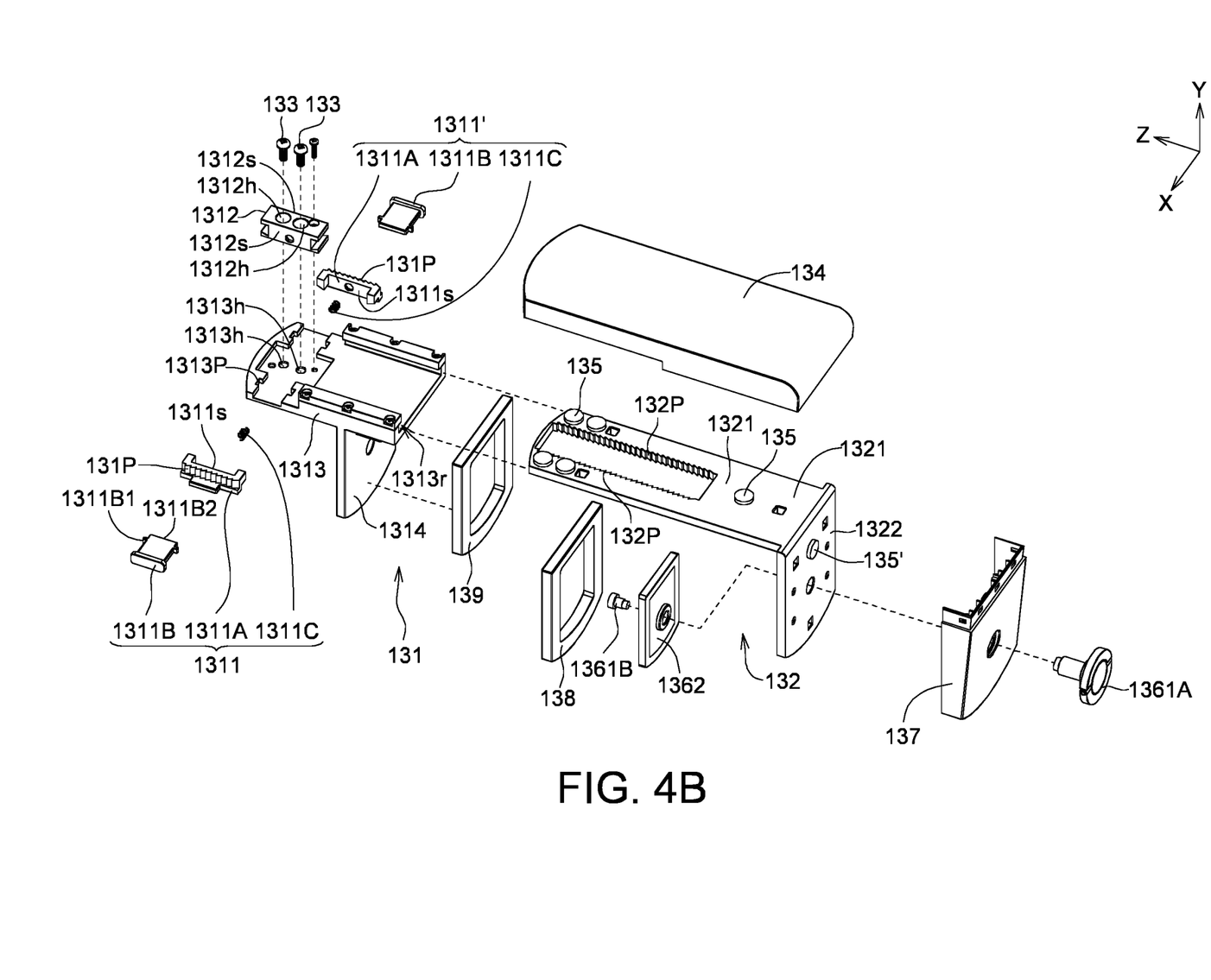
Figure 4C:
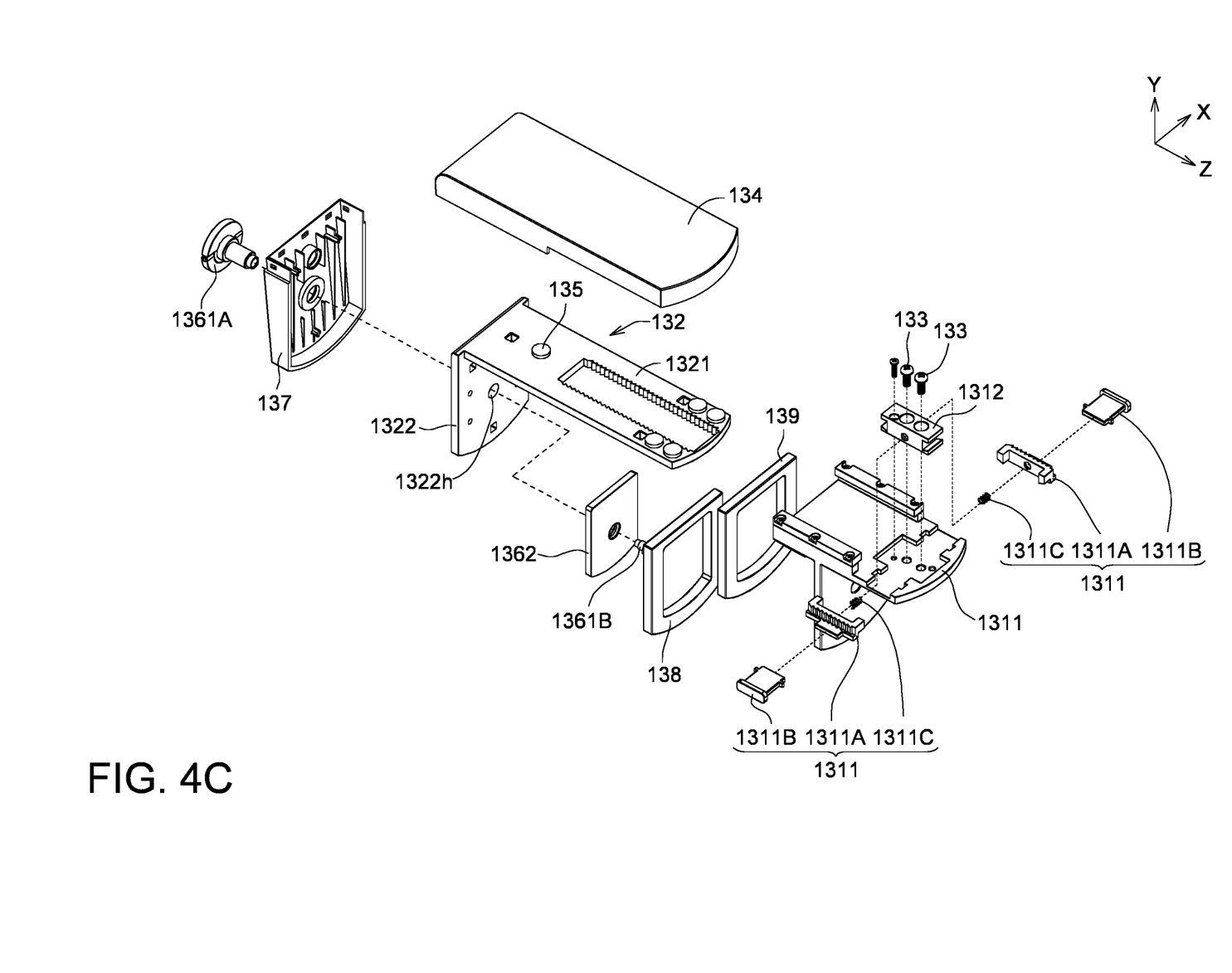

Refer to FIGS. 3 and 4A to 4C. FIG. 3 is an explosion diagram of the display device 100 of FIG. 1. FIGS. 4A to 4C are explosion diagrams of the fixing module 130 of FIG. 3 at different view angles.

As indicated in FIG. 4A to 4C, the fixing module 130 includes a first part 131 and a second part 132. The second part 132 is slidably or movably connected to the first part 131. The fixing module 130 is fixed to the first end 121 of the screen bracket 120 by the first part 131 (as indicated in FIG. 3A).

As indicated in FIG. 4A the first part 131 has at least one first engaging member 131P; the second part 132 has at least one second engaging member 132P; the first engaging member 131P can be selectively and correspondingly engaged with the second engaging member 132P, so that the first part 131 and the second part 132 can be selectively engaged with each other or detached from each other. When the first part 131 and the second part 132 are detached from each other, the first part 131 and the second part 132 can slide with respect to each other, so that the interval H1 between the first part 131 and the second part 132 can be adjusted to clamp different thicknesses of the board. When the first part 131 and the second part 132 are engaged with each other, relative positions between the first part 131 and the second part 132 are fixed. Moreover, a recess is formed between two adjacent first engaging members 131P, and a second engaging member 132P can be engaged in the recess. Likewise, a recess is formed between two adjacent second engaging members 132P, and a first engaging member 131P can be engaged in the recess. In an embodiment, several first parts 131 and several second engaging members 132P form a jagged shape, but the said arrangement is not for limiting the embodiments of the present invention.

As indicated in FIG. 4A to 4B, the first part 131 includes at least one locking element (such as a first locking element 1311 and a second locking element 1311'), a fixing portion 1312 and a first sliding plate 1313. Each locking element includes a locking portion 1311A and a pressing portion 1311B, wherein the locking portion 1311A has the said first engaging member 131P. The second part 132 includes a second sliding plate 1321, which has the said second engaging member 132P. In the present embodiment, the first locking element 1311 and the second locking element 1311' are respectively located on two opposite sides of the fixing portion 1312. The pressing portion 1311B has a pressing surface 1311B2 adjacent to the locking portion 1311A. In the present specification, "adjacent" means that two objects have direct contact or are close to each other but do not have direct contact. Take the first locking element 1311 for example. When the pressing portion 1311B is pressed towards the first de-locking direction –X, the pressing surface 1311B2 of the pressing portion 1311B can push the locking portion 1311A to move towards the first de-locking direction –X to release the engagement relationship between the first locking element 1311 and the second sliding plate 1321. Take the second locking element 1311' for example. When the pressing portion 1311B is pressed towards the second de-locking direction –X, the pressing portion 1311B pushes the locking portion 1311A to move towards the second de-locking direction –X to release the engagement relationship between the second locking element 1311' and the second sliding plate 1321. Thus, when the pressing portion 1311B of the first locking element 1311 and the pressing portion 1311B of the second locking element 1311' respectively are pushed towards the first de-locking direction –X and the second de-locking direction +X at the same time, the engagement relationship between the first part 131 and the second part 132 can be released, so that the first part 131 and the second part 132 can slide with respect to each other and the interval H1 between the first part 131 and the second part 132 can be adjusted.

As indicated in FIG. 4A, the pressing portion 1311B is protruded with respect to the outer side surface 1313s of the first sliding plate 1313 for the convenience of the user's operation. As indicated in FIG. 4B the first sliding plate 1313 has a limiting slot 1313P, which has a first length along the X direction. Take the first locking element 1311 for example. The pressing portion 1311B has at least one slider 1311B1, which can be disposed in the limiting slot 1313P. The slider 1311B1 has a second length along the X direction. The second length of the slider 1311B1 is shorter than the first length of the limiting slot 1313P, so that the slider 1311B1 can be translated with respect to the limiting slot 1313P along the X direction (the movement of the pressing portion 1311B). Structural features of the second locking element 1311' are similar or identical to that of the first locking element 1311, and therefore are not repeated here.

As indicated in FIGS. 4A and 4B, each of the first locking element 1311 and the second locking element 1311' includes an elastic portion 1311C. The elastic portion 1311C connects the fixing portion 1312 and the locking portion 1311A, so that the first engaging member 131P and the second engaging member 132P can be engaged with each other. To put it in greater details, the fixing portion 1312 has two opposite outer side surfaces 1312s. In the first locking element 1311, the locking portion 1311A has an inner side surface 1311s; an interval SP1 is formed between the outer side surface 1312s and the inner side surface 1311s; and the elastic portion 1311C is disposed in the interval SP1. The elastic portion 1311C can apply a force on the locking portion 1311A to push the first engaging member 131P to move towards the second engaging member 132P, so that the first engaging member 131P and the second engaging member 132P can be engaged with each other. In the first locking element 1311, one end of the elastic portion 1311C connects (or contacts) the outer side surface 1312 of the fixing portion 1312, and the other end of the elastic portion 1311C connects (or contacts) the inner side surface 1311s of the locking portion 1311A, so that the elastic portion 1311C applies a pre-force on the locking portion 1311A, and makes the first engaging member 131P and the second engaging member 132P always engaged with each other.

Structure features of the second locking element 1311' are similar or identical to that of the first locking element 1311, and therefore are not repeated here. Relative relationship between the second locking element 1311' and the fixing portion 1312 is identical or similar to that between the first locking element 1311 and the fixing portion 1312, and therefore is not repeated here. Relative relationship between the second locking element 1311' and the first sliding plate 1313 is identical or similar to that between the first locking element 1311 and the first sliding plate 1313, and therefore is not repeated here.

As indicated in FIGS. 4B to 4C, the fixing module 130 1312 can be fixed to the first end 121 (the first end 121 is illustrated in FIG. 3) through the fixing portion. For example, the fixing module 130 further includes at least one fixing element 133. The fixing portion 1312 has at least one through hole 1312$h$. The first sliding plate 1313 has at least one through hole 1313$h$. The first end 121 of the screen bracket 120 has at least one fixing hole 121$h$ (the fixing hole 121$h$ is illustrated in FIG. 3). The fixing element 133 can pass through the through hole 1312$h$ of the fixing portion 1312 and the through hole 1313$h$ of the first sliding plate 1313 and can be fixed in the fixing hole 121$h$ of the first end 121 to fix relative positions between the screen bracket 120 and the fixing module 130. In an embodiment, the fixing element 133 has an outer thread; the fixing hole 121$h$ has an inner thread; the outer thread and the inner thread are screwed to fix relative relationship among the first sliding plate 1313, the fixing portion 1312 and the screen bracket 120.

As indicated in FIG. 4B, the first sliding plate 1313 has a chute 1313$r$. The second sliding plate 1321 of the second part 132 is slidably disposed in the chute 1313$r$, so that the interval H1 between the first part 131 and the second part 132 can be adjusted.

As indicated in FIGS. 4B to 4C, the fixing module 130 further includes an outer cover 134 and at least one magnetic element 135. The magnetic element 135 and the outer cover 134 can be temporarily coupled by magnetic attraction. In an embodiment, the outer cover 134 has magnetism, and can generate magnetic attraction with the magnetic element 135. In another embodiment, the outer cover 134 has a magnetic element, which can generate magnetic attraction with the magnetic element 135. The outer cover 134 and the magnetic element 135 both are disposed on the first part 131 or the second part 132. In the present embodiment, the outer cover 134 and all magnetic element s135 are disposed on the second sliding plate 1321 of the second part 132, and the outer cover 134 and the magnetic element 135 both slide with the second sliding plate 1321, so that the outer cover 134 and the magnetic element 135 will not be separated during sliding.

Figure 5:
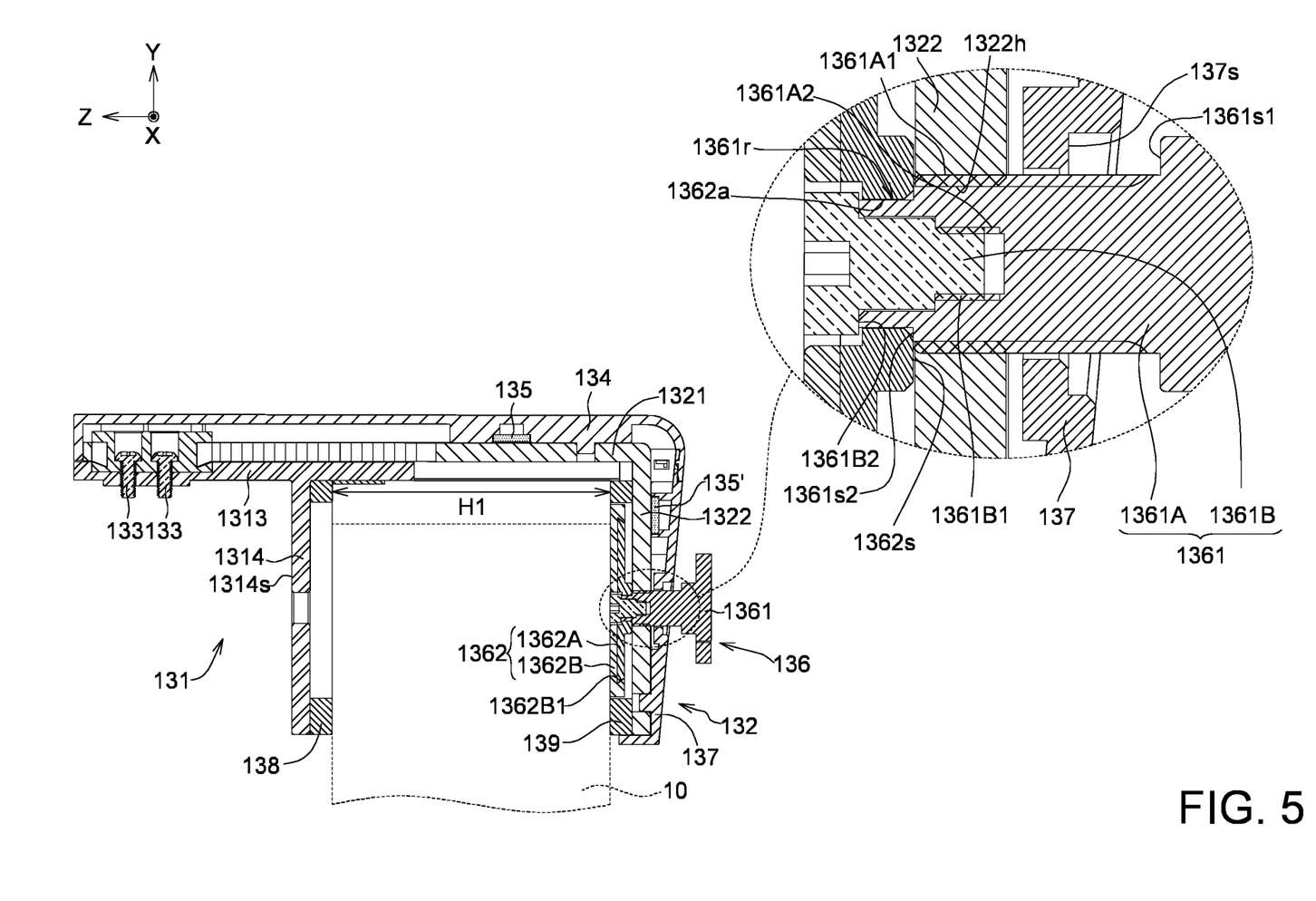
FIG. 5 is a cross-sectional view of the fixing module of FIG. 1 along a direction 5-5'.

Referring to FIG. 5, a cross-sectional view of the fixing module 130 of FIG. 1 along a direction 5-5' is illustrated. The first part 131 further includes a first sideboard 1314. The first sideboard 1314 and the first sliding plate 1313 are substantially vertically connected to each other. The second part 132 further includes a second sideboard 1322. The second sideboard 1322 and the second sliding plate 1321 are substantially vertically connected to each other. The first sideboard 1314 and the second sideboard 1322 substantially are parallel to each other and respectively press two parallelly extended surfaces of the board. However, in another embodiment, the first sideboard 1314 and the second sideboard 1322 also can form an acute angle.

As indicated in FIG. 5 the fixing module 130 further includes a fixing assembly 136 for fixing relative relationship among the board 10, the first sideboard 1314 and the second sideboard 1322. For example, the fixing assembly 136 includes a abutting portion 1362 and a screw portion 1361. The screw portion 1361 can be screwed to the second sideboard 1322 and has an end portion 1361A connected to the abutting portion 1362 by rotation but cannot be connected thereto by translation. Thus, when the screw portion 1361 and the second sideboard 1322 rotate with respect to each other, the end portion 1361A can push the abutting portion 1362 to translate towards the first sideboard 1314 without rotating the abutting portion 1362.

As indicated in FIG. 5, the screw portion 1361 includes a first sub-screw portion 1361A and a second sub-screw portion 1361B. The first sub-screw portion 1361A has a first male screw 1361A1 and a female screw 1361A2. The second sub-screw portion 1361B has a second male screw 1361B1. The first male screw 1361A1 of the first sub-screw portion 1361A is screwed to the screw hole 1322$h$ of the second sideboard 1322, so that the first sub-screw portion 1361A and the second sideboard 1322 can perform screw movement and move along the Z direction. The first sub-screw portion 1361A has a stopping surface 1361$s$1. The fixing module 130 further includes an outer cover 137, which has a stopping surface 137$s$. The screw portion 1361 can move with respect to the outer cover 137 along the direction +Z until the stopping surface 1361$s$1 is stopped by the stopping surface 137$s$ of the outer cover 137, wherein the position where the stopping surface 1361$s$1 is stopped is a limit position of the screw portion 1361. The abutting portion 1362 has an end surface 1362$s$. The screw portion 1361 can move with respect to the outer cover 137 along the direction −Z until the end surface 1362$s$ is stopped by the second sideboard 1322, wherein the position where the end surface 1362$s$ is stopped is another limit position of the screw portion 1361. Besides, the first sub-screw portion 1361A has an end surface 1361$s$2 adjacent to the abutting portion 1362. The first male screw 1361A1 can be extended between the stopping surface 1361$s$1 and the end surface 1361$s$2 of the screw portion 1361. The female screw 1361A2 is screwed to the second male screw 1361B1 of the second sub-screw portion 1361B to fix relative positions between the first sub-screw portion 1361A and the second sub-screw portion 1361B.

As indicated in FIG. 5 the outer cover 137 is disposed on the second sideboard 1322. The fixing module 130 further includes at least one magnetic element 135'. The magnetic element 135' and the outer cover 137 can be temporarily coupled by magnetic attraction. In an embodiment, the outer cover 137 has magnetism, and can generate magnetic attraction with the magnetic element 135'. In another embodiment, the outer cover 137 has a magnetic element, which can generate magnetic attraction with the magnetic element 135'. The outer cover 137 and the magnetic element 135' both are disposed on the first part 131 or the second part 132. In the present embodiment, the outer cover 137 and all magnetic element s135' are disposed on the second sideboard 1322 of the second part 132, and the outer cover 137 and the magnetic element 135' both slide with the second sliding plate 1321, so that the outer cover 137 and the magnetic element 135' will not be separated during sliding.

Besides, the screw portion 1361 includes a groove, the abutting portion 1362 includes a limiting portion. The limiting portion is located in the groove, so that the screw portion 1361 and the abutting portion 1362 can be linked. For example, As indicated in FIG. 5, the second sub-screw portion 1361B has an end surface 1361B2. A groove 1361$r$ is formed between the end surface 1361B2 of the second sub-screw portion 1361B and the end surface 1361$s$2 of the first sub-screw portion 1361A. The abutting portion 1362 includes a limiting portion 1362$a$ located and confined in the groove 1361$r$. Thus, when the screw portion 1361 is translated along the pressing direction +Z or the releasing direction −Z, the end surface 1361$s$2 or the end surface 1361B2 can push the limiting portion 1362$a$ to drive the abutting portion 1362 to translate along the pressing direction +Z or the releasing direction −Z. The pressing direction +Z is the direction in which the board 10 is pressed on the first sideboard 1314; the releasing direction +Z is the direction in which the pressing relationship between the board 10 and the first sideboard 1314 is released.

As indicated in FIG. 5, the abutting portion 1362 includes a first sub-abutting portion 1362A and a second sub-abutting portion 1362B. The first sub-abutting portion 1362A and the second sub-abutting portion 1362B are coupled such as by fixing each other. The second sub-abutting portion 1362B can be realized by a buffer pad, which is soft and has low hardness. The fixing assembly 136 contacts the board 10 by the second sub-abutting portion 1362B, and therefore does not damage the board 10. The second sub-abutting portion 1362B has a groove 1362B1, in which the first sub-abutting portion 1362A can be engaged. Moreover, the fixing module 130 further includes buffer pads 138 and 139, wherein the buffer pad 138 is disposed on the first sideboard 1314, the buffer pad 139 is disposed on the second sideboard 1322, and the buffer pad 138 and the buffer pad 139 are disposed oppositely. Thus, the board 10 located between the first sideboard 1314 and the second sideboard 1322 can contact the buffer pad 138 and the buffer pad 139 (when being clamped tightly), and the board 10 will not be damaged.

As indicated in FIG. 5, the second sub-screw portion 1361B further has a groove 1362r. A tool (such as a flat screwdriver or a cross screwdriver) can be loaded into the groove 1362r to rotate the second sub-screw portion 1361B and to release the fixing relationship between the first sub-screw portion 1361A and the second sub-screw portion 1361B. After the fixing relationship between the first sub-screw portion 1361A and the second sub-screw portion 1361B is released, the screw portion 1361 and the abutting portion 1362 can be detached from the second part 132. Then, the screw portion 1361 and the abutting portion 1362 are arranged on the first part 131, so that the fixing module can be arranged on the second end 122.

In the above embodiment, the fixing module 130 is fixed to the first end 121. In the following embodiment, the fixing module 130 is fixed to the second end 122 as illustrated in FIGS. 6 to 8.

Figure 6:
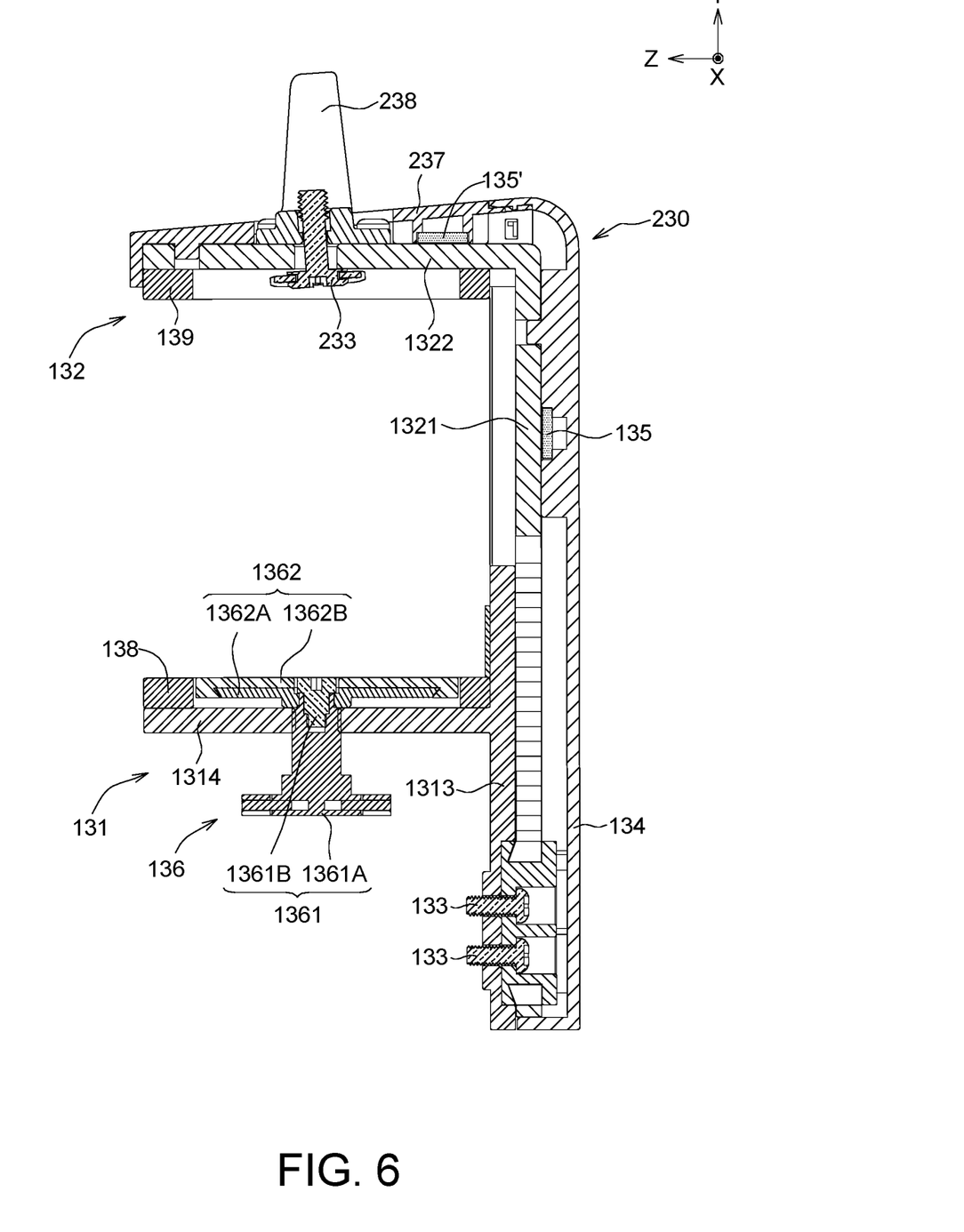
FIG. 6 is a cross-sectional view of the fixing module of FIG. 7 along a direction 6-6'.
Figure 7:
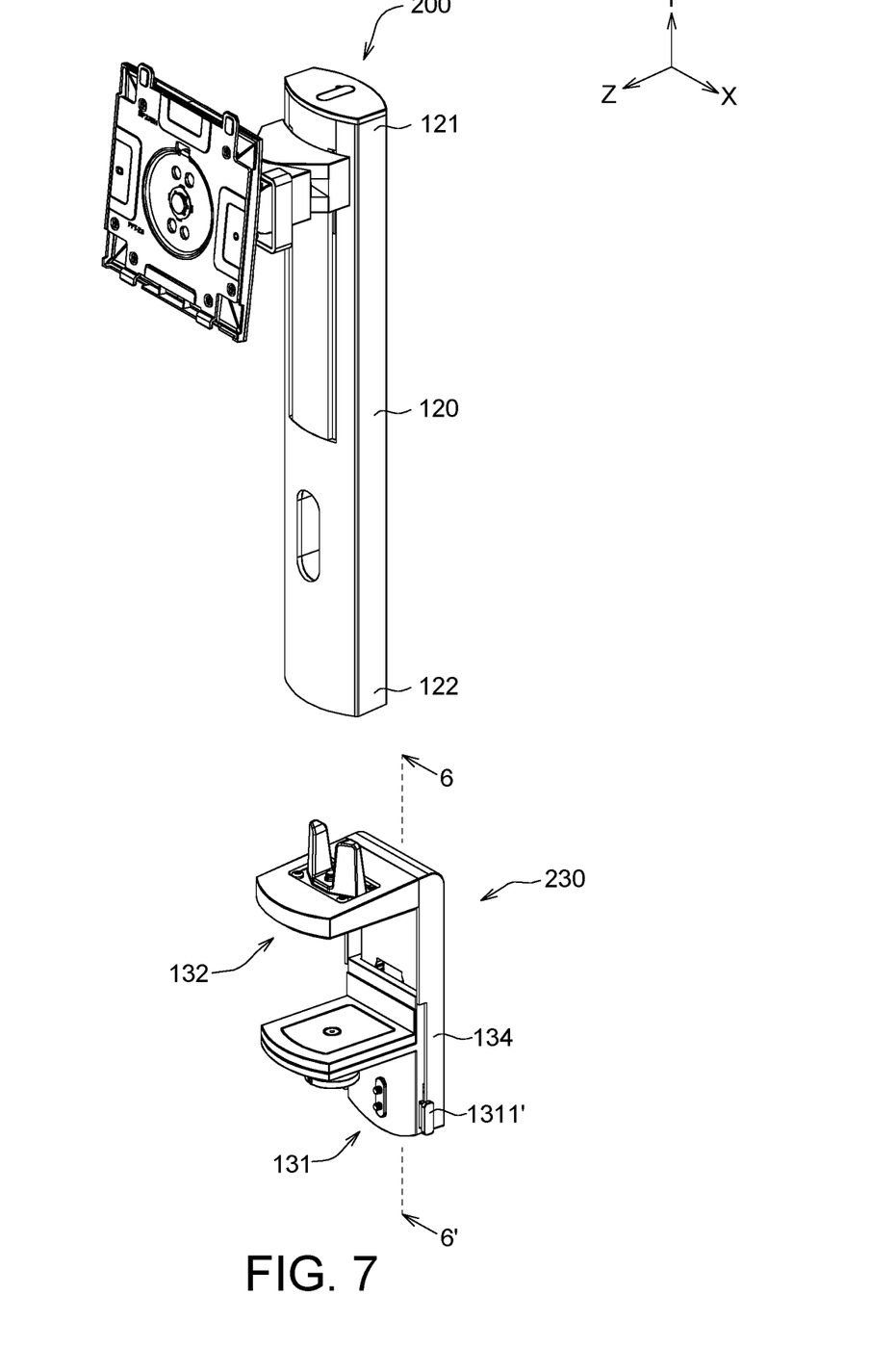
FIG. 7 is an explosion diagram of the display device of FIG. 2.
Figure 8:
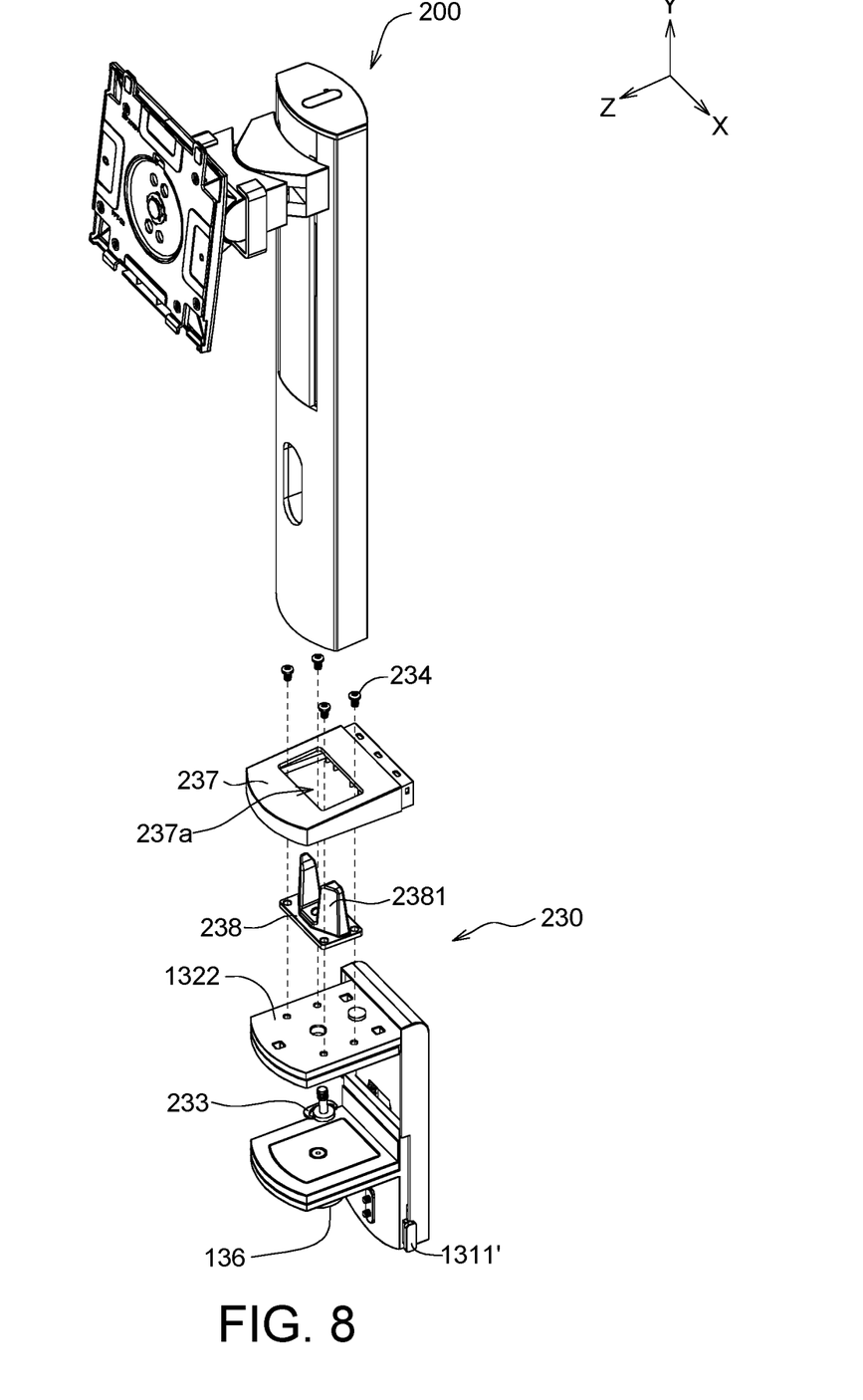
FIG. 8 is an explosion diagram of the fixing module of FIG. 7.

Refer to FIGS. 6 to 8. FIG. 6 is a cross-sectional view of the fixing module 230 of FIG. 7 along a direction 6-6'. FIG. 7 is an explosion diagram of the display device 100 of FIG. 2. FIG. 8 is an explosion diagram of the fixing module 230 of FIG. 7.

As indicated in FIGS. 6 to 7, the display device 200 includes a screen 110 (not illustrated), a screen bracket 120 and a fixing module 230. The screen 110 is pivotally connected to the screen bracket 120. The screen bracket 120 includes a first end 121 and a second end 122. In the present embodiment, the fixing module 230 is fixed to the second end 122.

As indicated in FIGS. 6 to 8, the fixing module 230 includes a first part 131, the second part 132, at least one fixing element 133, an outer cover 134, at least one magnetic element 135, at least one magnetic element 135', a fixing assembly 136, buffer pads 138 and 139, an outer cover 237, an adaptor 238, and a fixing element 233. The first part 131 includes at least one locking element (such as a first locking element 1311 (not illustrated) and a second locking element 1311'), a fixing portion 1312 (not illustrated), a first sliding plate 1313 and a first sideboard 1314. The second part 132 includes a second sliding plate 1321 and a second sideboard 1322.

The fixing module 230 and the fixing module 130 share some elements. For example, at least the first part 131, the second part 132, at least one fixing element 133, the outer cover 134, at least one magnetic element 135, at least one magnetic element 135' and the fixing assembly 136 are common to the fixing module 230 and the fixing module 130. In the present embodiment, the fixing assembly 136 is arranged on the first sideboard 1314 of the first part 131. The connection relationship between the fixing assembly 136 and the first sideboard 1314 is similar or identical to that between the fixing assembly 136 and the second sideboard 1322, and therefore is not repeated here. In other words, the first sideboard 1314 has a structure similar or identical to that of the second sideboard 1322, and therefore can be connected to the fixing assembly 136.

As indicated in FIGS. 6 to 8, the fixing element 233 passes through the second sideboard 1322 and the adaptor 238 to be fixed on the second end 122 of the screen bracket 120 (not illustrated). Besides, the adaptor 238 includes at least one protrusion 2381, which can be engaged in the indent of the second end 122 (not illustrated). Also, the fixing module 230 further includes at least one fixing element 234, which passes through the adaptor 238 to be fixed on the second sideboard 1322 to fix relative positions between the adaptor 238 and the second sideboard 1322. The outer cover 237 has an opening hole 237a, which allows the protrusion 2381 of the adaptor 238 to pass through so that the protrusion 2381 can be easily engaged in the indent of the second end 122.

To summarize, the present invention provides a fixing module and a display device using the same. The fixing module includes a first part and a second part. The fixing module can be fixed to the first end of the screen bracket by the first part or fixed to the second end of the screen bracket by the second part. In an embodiment, without changing relative connection relationship between the first part and the second part, the fixing module can be selectively connected to one of a first end and a second end of the screen bracket, so that the scope of application of the fixing module can be expanded.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A fixing module suitable for being fixed to one of a first end and a second end of a screen bracket, wherein the fixing module comprises:
    a first part; and
    a second part slidably connected to the first part;
    wherein the fixing module is configured to be fixed to a first terminal surface of the first end of the screen bracket by the first part or fixed to a second terminal surface of the second end of the screen bracket by the second part, and the first terminal surface is opposite to the second terminal surface;
    wherein the second part comprises a second engaging member, and the first part comprises:
    a locking element, comprising:
        a locking portion having a first engaging member selectively and correspondingly engaged with the second engaging member; and
        a pressing portion configured for pushing the locking portion to move.

2. The fixing module according to claim 1, wherein the pressing portion is disposed opposite to the locking portion and having a pressing surface adjacent to the locking portion, wherein when the pressing surface pushes the locking portion to move along a de-locking direction, the first engaging member and the second engaging member are detached from each other.

3. The fixing module according to claim 2, wherein the first part further comprises:
a fixing portion configured to be fixed to the first end; and
wherein the locking element further comprises an elastic portion connecting the fixing portion with the locking portion, so that the first engaging member and the second engaging member are engaged with each other.

4. The fixing module according to claim 3, wherein the fixing portion has an outer side surface, the locking portion has an inner side surface, there is an interval formed between the outer side surface and the inner side surface, and the elastic portion is disposed within the interval.

5. The fixing module according to claim 2, comprising two locking elements, wherein each of the two locking elements comprises the locking portion and the pressing portion, and the two locking elements are respectively disposed on two opposite sides of the fixing portion.

6. The fixing module according to claim 1, wherein the first part comprises:
a first sliding plate fixed to the first end and having a chute;
wherein the second part comprises a second sliding plate slidably disposed in the chute.

7. The fixing module according to claim 1, wherein each of the first part and the second part comprises a sideboard, and the fixing module further comprises:
an abutting portion; and
a screw portion screwed to the sideboard and having an end portion, wherein the end portion is connected to the abutting portion by rotatable but not translatable way.

8. The fixing module according to claim 7, wherein the abutting portion is a buffer pad.

9. The fixing module according to claim 7, wherein the screw portion comprises a groove, and the abutting portion comprises a limiting portion located within the groove.

10. The fixing module according to claim 1, wherein the first part comprises a first sliding plate and a first sideboard which are substantially perpendicular and connected to each other; the second part comprises a second sliding plate and a second sideboard which are substantially perpendicular and connected to each other; the first sideboard and the second sideboard are parallel to each other.

11. A display device, comprising:
a screen bracket comprising a first end and a second end;
a screen pivotally connected to the screen bracket; and
a fixing module selectively fixed to one of the first end and the second end and comprising:
a first part; and
a second part slidably connected to the first part;
wherein the fixing module is configured to be fixed to a first terminal surface of the first end of the screen bracket by the first part or fixed to a second terminal surface of the second end of the screen bracket by the second part, and the first terminal surface is opposite to the second terminal surface;
wherein the second part comprises a second engaging member, and the first part comprises:
a locking element, comprising:
a locking portion having a first engaging member selectively and correspondingly engaged with the second engaging member; and
a pressing portion configured for pushing the locking portion to move.

12. The display device according to claim 11, wherein the pressing portion disposed opposite to the locking portion and having a pressing surface adjacent to the locking portion, wherein when the pressing surface pushes the locking portion to move along a de-locking direction, the first engaging member and the second engaging member are detached from each other.

13. The display device according to claim 12, wherein the first part further comprises:
a fixing portion configured to be fixed to the first end; and
wherein the locking element further comprises an elastic portion connecting the fixing portion with the locking portion, so that the first engaging member and the second engaging member are engaged with each other.

14. The display device according to claim 13, wherein the fixing portion has an outer side surface, the locking portion has an inner side surface, there is an interval formed between the outer side surface and the inner side surface, and the elastic portion is disposed within the interval.

15. The display device according to claim 12, wherein the fixing module comprises two locking elements, wherein each of the two locking elements comprises the locking portion and the pressing portion, and the two locking elements are respectively disposed on two opposite sides of the fixing portion.

16. The display device according to claim 11, wherein the first part comprises:
a first sliding plate fixed to the first end and having a chute;
wherein the second part comprises a second sliding plate slidably disposed in the chute.

17. The display device according to claim 11, wherein each of the first part and the second part comprises a sideboard, and the fixing module further comprises:
an abutting portion; and
a screw portion screwed to the sideboard and having an end portion, wherein the end portion is connected to the abutting portion by rotatable but not translatable way.

18. The display device according to claim 17, the abutting portion is a buffer pad.

19. A display device, comprises:
a screen bracket comprising a first end and a second end;
a screen pivotally connected to the screen bracket; and
a fixing module suitable for being fixed to one of the first end and the second end of the screen bracket;
wherein the fixing module further comprises:
a first part; and
a second part movably connected to the first part;
wherein the fixing module is configured to be fixed to a first terminal surface of the first end of the screen bracket by the first part or fixed to a second terminal surface of the second end of the screen bracket by the second part, and the first terminal surface is opposite to the second terminal surface;
wherein the second part has a second engaging member, and the first part comprises:
a locking element, comprising:
a locking portion having a first engaging member selectively and correspondingly engaged with the second engaging member; and
a pressing portion configured for pushing the locking portion to move.

* * * * *